(12) United States Patent
Jaśkiewicz

(10) Patent No.: US 10,648,581 B2
(45) Date of Patent: May 12, 2020

(54) CHECK VALVES

(71) Applicant: Hamilton Sundstrand Corporation, Charlotte, NC (US)

(72) Inventor: Zbigniew Jaśkiewicz, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 20 days.

(21) Appl. No.: 16/168,865

(22) Filed: Oct. 24, 2018

(65) Prior Publication Data

US 2019/0186645 A1 Jun. 20, 2019

(30) Foreign Application Priority Data

Dec. 15, 2017 (EP) .................................... 17461647

(51) Int. Cl.
*F16K 15/03* (2006.01)
*F16K 27/02* (2006.01)
*F16K 47/04* (2006.01)

(52) U.S. Cl.
CPC ........ *F16K 15/038* (2013.01); *F16K 27/0209* (2013.01); *F16K 47/045* (2013.01); *Y10T 137/7838* (2015.04); *Y10T 137/7839* (2015.04); *Y10T 137/7841* (2015.04); *Y10T 137/7874* (2015.04); *Y10T 137/7875* (2015.04); *Y10T 137/7903* (2015.04)

(58) Field of Classification Search
CPC ......... Y10T 137/7839; Y10T 137/7838; Y10T 137/7875; Y10T 137/7874; Y10T 137/7903; Y10T 137/7841; F16K 15/038; F16K 27/0209; F16K 47/045
See application file for complete search history.

(56) References Cited

U.S. PATENT DOCUMENTS 4,230,148 A 10/1980 Ogle, Jr.
4,693,269 A * 9/1987 Yamada ................ F16K 15/033
137/484.2

(Continued)

FOREIGN PATENT DOCUMENTS

JP H10141525 A 5/1998

OTHER PUBLICATIONS

Extended European Search Report for International Application No. 17461647.4 dated Jun. 12, 2018, 5 pages.

*Primary Examiner* — Craig M Schneider
*Assistant Examiner* — Frederick D Soski
(74) *Attorney, Agent, or Firm* — Cantor Colburn LLP

(57) ABSTRACT

A check valve including a valve housing defining a pair of valve openings; a pair of flappers pivotably mounted for rotation relative to the housing between an open position in which they permit fluid flow through the respective valve openings and a closed position in which they prevent fluid flow through the valve openings; and a stop element arranged such that the flappers will contact the stop element in their open positions. Each flapper includes a primary flapper element pivotally mounted to a hinge pin that extends across the valve, and a secondary flapper element. The primary flapper element further includes at least one flapper opening formed therethrough. The secondary flapper element is pivotally mounted such that it may rotate relative to the primary flapper element for opening and closing the at least one flapper opening in the primary flapper element.

15 Claims, 7 Drawing Sheets

(56) References Cited

U.S. PATENT DOCUMENTS

| | | | | |
|---|---|---|---|---|
| 4,892,540 A | * | 1/1990 | Vallana | A61F 2/2403 137/512.1 |
| 4,896,695 A | * | 1/1990 | Pysh | F16K 15/038 137/512.1 |
| 4,964,422 A | * | 10/1990 | Ball | F16K 1/221 137/512.1 |
| 4,967,790 A | * | 11/1990 | Ganske | F16K 15/03 137/514.5 |
| 4,971,103 A | * | 11/1990 | Scaramucci | F16K 15/03 137/454.2 |
| 4,977,924 A | * | 12/1990 | Scaramucci | F16K 15/03 137/454.2 |
| 4,982,759 A | * | 1/1991 | Scaramucci | F16K 15/03 137/328 |
| 4,989,635 A | * | 2/1991 | Dunmire | F16K 15/033 137/512 |
| 5,000,223 A | * | 3/1991 | Scaramucci | F16K 15/03 137/515.7 |
| 5,002,567 A | * | 3/1991 | Bona | A61F 2/2406 623/2.22 |
| 5,004,010 A | * | 4/1991 | Huet | F16K 17/28 137/513.3 |
| 5,026,391 A | * | 6/1991 | McQueen | A61F 2/2403 137/512.1 |
| 5,037,542 A | * | 8/1991 | Carroll | E01F 5/005 137/527.8 |
| 5,044,396 A | * | 9/1991 | Daudet | F16K 15/03 137/515.5 |
| 5,046,525 A | * | 9/1991 | Powell | E03C 1/106 137/512 |
| 5,061,278 A | * | 10/1991 | Bicer | A61F 2/2403 137/512.1 |
| 5,078,737 A | * | 1/1992 | Bona | A61F 2/2403 623/2.33 |
| 5,078,739 A | * | 1/1992 | Martin | A61F 2/2403 137/512 |
| 5,080,669 A | * | 1/1992 | Tascon | A61F 2/2403 137/512.1 |
| 5,088,905 A | * | 2/1992 | Beagle | F04C 29/126 418/55.1 |
| 5,090,445 A | * | 2/1992 | Jackson | F23L 13/02 137/527.8 |
| 5,107,888 A | * | 4/1992 | Dunmire | E03C 1/106 137/512 |
| 5,116,366 A | * | 5/1992 | Hwang | A61F 2/2403 137/512.1 |
| 5,127,927 A | * | 7/1992 | Holmes | F24F 3/1603 137/527.8 |
| 5,135,538 A | * | 8/1992 | Pawlak | A61F 2/2406 137/512 |
| 5,141,020 A | * | 8/1992 | Sunderhaus | B60K 15/0406 137/467 |
| 5,143,112 A | * | 9/1992 | Scaramucci | F16K 15/03 137/315.01 |
| 5,143,113 A | * | 9/1992 | Scaramucci | F16K 15/03 137/315.01 |
| 5,143,117 A | * | 9/1992 | Klein | E03C 1/104 137/512.15 |
| 5,150,733 A | * | 9/1992 | Scaramucci | F16K 15/03 137/454.2 |
| 5,154,693 A | * | 10/1992 | East | A61M 27/002 137/512 |
| 5,156,182 A | * | 10/1992 | Scaramucci | F16K 15/03 137/454.2 |
| 5,156,183 A | * | 10/1992 | Scaramucci | F16K 15/033 137/454.2 |
| 5,159,953 A | * | 11/1992 | Sato | B60K 15/04 137/454.2 |
| 5,161,566 A | * | 11/1992 | Scaramucci | F16K 15/03 137/328 |
| 5,161,570 A | * | 11/1992 | Scaramucci | F16K 15/03 137/454.5 |
| 5,171,263 A | * | 12/1992 | Boyer | A61F 2/2403 137/512.1 |
| 5,172,721 A | * | 12/1992 | Sato | B60K 15/04 137/512.1 |
| 5,172,888 A | * | 12/1992 | Ezekoye | F16K 15/03 137/527.8 |
| 5,176,170 A | * | 1/1993 | Boyesen | F01L 3/205 123/65 V |
| 5,178,631 A | * | 1/1993 | Waits | A61F 2/2403 137/512.1 |
| 5,178,632 A | * | 1/1993 | Hanson | A61F 2/2403 137/512.1 |
| 5,181,535 A | * | 1/1993 | Scaramucci | F16K 15/03 137/515.5 |
| 5,191,913 A | * | 3/1993 | Scaramucci | F16K 15/03 137/454.2 |
| 5,194,038 A | * | 3/1993 | Klomhaus | B60H 1/249 137/512.1 |
| 5,195,927 A | * | 3/1993 | Raisanen | A01K 1/0064 137/527.8 |
| 5,197,980 A | * | 3/1993 | Gorshkov | A61F 2/2403 137/512.1 |
| 5,201,685 A | * | 4/1993 | Raisanen | A01K 1/0058 454/259 |
| 5,222,519 A | * | 6/1993 | Sato | F16K 15/035 137/512.1 |
| 5,236,007 A | * | 8/1993 | Scaramucci | F16K 15/03 137/454.2 |
| 5,236,009 A | * | 8/1993 | Ackroyd | E03C 1/104 137/454.2 |
| 5,236,451 A | * | 8/1993 | Bokros | A61F 2/2403 137/521 |
| 5,245,956 A | * | 9/1993 | Martin | F01L 3/205 123/73 V |
| 5,246,032 A | * | 9/1993 | Muddiman | F16K 15/038 137/512.1 |
| 5,251,657 A | * | 10/1993 | Scaramucci | F16K 15/03 137/315.21 |
| 5,259,411 A | * | 11/1993 | Guzorek | F23L 13/02 110/163 |
| 5,285,816 A | * | 2/1994 | Herlihy | F16K 15/144 137/856 |
| 5,301,709 A | * | 4/1994 | Gasaway | F16K 15/038 137/15.18 |
| 5,314,467 A | * | 5/1994 | Shu | A61F 2/2403 137/521 |
| 5,318,063 A | * | 6/1994 | Muddiman | F16K 15/038 137/454.2 |
| 5,341,840 A | * | 8/1994 | Manson | F16K 15/03 137/527.8 |
| 5,365,975 A | * | 11/1994 | Cote | F16K 17/12 137/875 |
| 5,381,821 A | * | 1/1995 | Muddiman | F16K 15/038 137/454.2 |
| 5,383,485 A | * | 1/1995 | Lai | F16K 11/052 137/102 |
| 5,392,810 A | * | 2/1995 | Cooper | F16K 15/038 137/512.1 |
| 5,584,315 A | * | 12/1996 | Powell | E03F 7/04 137/15.18 |
| 5,607,469 A | * | 3/1997 | Frey | A61F 2/2403 137/512.1 |
| 5,622,205 A | * | 4/1997 | Petersen | F16K 15/181 137/242 |
| 5,671,769 A | * | 9/1997 | Booth | F16K 15/03 137/15.18 |
| 5,713,389 A | * | 2/1998 | Wilson, Jr. | E21B 34/06 137/515.7 |
| 5,716,271 A | * | 2/1998 | Paidosh | D06F 58/20 137/527.8 |
| 5,727,999 A | * | 3/1998 | Lewis | B60H 1/249 137/527.8 |
| 5,746,246 A | * | 5/1998 | Yokota | F16K 15/033 137/514 |
| 5,855,224 A | * | 1/1999 | Lin | E03B 7/077 137/512 |

(56) References Cited

U.S. PATENT DOCUMENTS

| | | | | |
|---|---|---|---|---|
| 5,861,029 A * | 1/1999 | Evdokimov | ........... | A61F 2/2403 137/527.8 |
| 5,878,773 A * | 3/1999 | Robol | ..................... | F04B 49/24 137/112 |
| 5,913,642 A * | 6/1999 | Boehler | ................. | D01G 23/02 137/513.5 |
| 5,921,862 A * | 7/1999 | Ucciardi | ................... | F24F 11/75 454/353 |
| 5,960,825 A * | 10/1999 | Scancarello | ............ | C21D 1/09 137/512 |
| 6,009,894 A * | 1/2000 | Trussart | ............... | G05D 7/0173 137/114 |
| 6,012,483 A * | 1/2000 | Beddies | .................... | G01F 1/11 137/512.1 |
| 6,044,862 A * | 4/2000 | Schumann | .......... | F04B 39/1086 137/512 |
| 6,085,781 A * | 7/2000 | Boutry | ................... | F16K 17/12 137/527 |
| 6,109,297 A * | 8/2000 | Shackelford | ........... | F16K 51/00 137/527.6 |
| 6,192,933 B1 * | 2/2001 | Engelmann | ............. | E03B 7/077 137/512 |
| 6,237,625 B1 * | 5/2001 | Randolph | ............. | F16K 15/038 137/512.15 |
| 6,264,452 B1 * | 7/2001 | Sun | ....................... | F04C 29/126 137/527.4 |
| 6,328,052 B1 * | 12/2001 | Loyning | ............... | F16K 5/0605 137/1 |
| 6,432,135 B1 * | 8/2002 | Goldowsky | ........... | A61F 2/2403 137/512.1 |
| 6,475,078 B1 * | 11/2002 | Borcherding | ........ | A01K 1/0064 454/259 |
| 6,543,474 B2 * | 4/2003 | Fetterman, Jr. | ......... | F16K 15/03 122/14.31 |
| 6,557,645 B1 * | 5/2003 | Ringer | ................... | A62C 35/62 137/516.25 |
| 6,648,010 B1 * | 11/2003 | Goodwin | ................ | F16K 15/03 137/491 |
| 6,668,858 B1 * | 12/2003 | Bazargan | .............. | F16K 15/033 137/269.5 |
| 6,789,568 B1 * | 9/2004 | Bunnell | ................ | B60K 15/03 137/265 |
| 6,823,905 B1 * | 11/2004 | Smith | ..................... | B60P 7/065 137/522 |
| 6,848,468 B1 * | 2/2005 | Hsien | .................... | E03F 5/0405 137/362 |
| 7,273,062 B1 * | 9/2007 | Stender, Jr. | ............. | F16K 17/32 137/2 |
| 7,568,498 B2 | 8/2009 | Denike et al. | | |
| 7,874,307 B1 * | 1/2011 | Deocampo | ............ | F16K 15/033 137/15.09 |
| 8,991,415 B1 * | 3/2015 | Luppino | ................... | E03B 9/04 137/272 |
| 9,404,248 B1 * | 8/2016 | Marshall | .................... | E03F 7/04 |
| 9,506,575 B2 * | 11/2016 | Fallon | ............... | F16K 27/0227 |
| 9,581,256 B2 | 2/2017 | Barone | | |
| 10,088,065 B2 * | 10/2018 | Olejak | ................... | F16K 15/038 |
| 2008/0078458 A1 | 4/2008 | Denike et al. | | |
| 2013/0019966 A1 | 1/2013 | Hawa | | |
| 2016/0084393 A1 | 3/2016 | Barone | | |
| 2017/0204981 A1 | 7/2017 | Olejak | | |
| 2017/0292621 A1 | 10/2017 | Olszowy | | |
| 2017/0328485 A1 * | 11/2017 | Yang | .................... | F16K 15/035 |

* cited by examiner

CHECK VALVES

FOREIGN PRIORITY

This application claims priority to European Patent Application No. 17461647.4 filed Dec. 15, 2017, the entire contents of which is incorporated herein by reference.

TECHNICAL FIELD

The present disclosure relates to check valves.

BACKGROUND

Check valves are valves that allow fluid flow in one direction therethrough and prevent flow in the opposite direction. They are widely used in a range of applications, for example in air conditioning systems, for example in aircraft air conditioning systems.

Check valves commonly include a pair of valve elements or flappers located at an opening in a valve housing. The flappers are hingedly supported on a hinge pin mounted to the valve housing for rotation between a closed position in which they lie across and close the opening, preventing fluid flow through the opening in one direction and an open position in which, under the pressure of a fluid (gas or liquid) on one side of the check valve, the flappers rotate from their closed positions so as to allow the fluid to flow through the valve in the opposite direction.

In known check valve arrangements, a stop is provided to limit the rotational movement of the flapper elements as they open. Typically, the stop comprises a stop pin which is mounted to posts arranged on opposed sides of the valve housing opening. The stop pin is spaced from the opening such that when the flappers open, they engage the stop pin.

In one known check valve arrangement, as in US 2017/0204981 A1, each flapper comprises a primary flapper element and a secondary flapper element, each pivotally mounted to a hinge extending across the valve. The primary flapper element comprises a flapper opening therethrough and the secondary flapper element is pivotally mounted to the hinge pin such that it may rotate relative to the primary flapper element for opening or closing the flapper opening.

The present disclosure relates to a check valve of this general construction having a modified stop arrangement.

SUMMARY

From a first aspect, the disclosure provides a check valve including a valve housing defining a pair of valve openings; a pair of flappers pivotably mounted for rotation relative to the housing between an open position in which they permit fluid flow through the respective valve openings and a closed position in which they prevent fluid flow through the valve openings; and a stop element arranged such that the flappers will contact the stop element in their open positions. Each flapper includes a primary flapper element pivotally mounted to a hinge pin that extends across the valve, and a secondary flapper element. The primary flapper element further includes at least one flapper opening formed therethrough. The secondary flapper element is pivotally mounted such that it may rotate relative to the primary flapper element for opening and closing the at least one flapper opening in the primary flapper element. The stop element, the primary flapper element and secondary flapper element are configured such that when the flapper is in the open position and in contact with the stop element, both the primary and secondary flapper elements contact the stop element and a clearance is provided between the primary flapper element and the secondary flapper element of the flapper.

The check valve may further include one or more bumpers provided on the primary flapper elements and/or the stop element for creating the clearance.

The check valve may include at least one bumper on the primary flapper element, for contacting the stop element in the open position.

The check valve may include at least one bumper provided on the stop element for contacting the primary flapper element in the open position.

The at least one bumper may include a collar that extends circumferentially around the stop element.

The bumpers may be symmetrically arranged about a hinge pin axis.

Alternatively, the bumpers may be asymmetrically arranged about a hinge pin axis.

The check valve may include a pair of bumpers, one to either side of the secondary flapper element.

The pair of bumpers may be symmetrically arranged about a central axis.

The at least one bumper may have a greater height than the thickness of the secondary flapper element.

The check valve may further include a recess defined in the stop element for receiving the secondary flapper element.

The recess may have a depth greater than the thickness of the secondary flapper element.

The check valve may include a pair of recesses arranged on opposed sides of the stop element.

The check valve may include comprising an annular recess formed on the stop element.

The disclosure also provides a check valve flapper that includes a primary flapper element and a secondary flapper element. The primary and secondary flapper elements have mounting lugs for pivotally mounting the elements to a common hinge pin. The primary flapper element has at least one flapper opening formed therethrough. The secondary flapper element is configured to be rotatable relative to the primary flapper element and to cooperate with the primary flapper element to close the at least one flapper opening in one relative rotational position. The primary flapper element includes at least one bumper formed on the same side of the primary flapper element as the secondary flapper element. The bumper has a height greater than a thickness of the secondary flapper element.

DETAILED DESCRIPTION

Figure 1A:
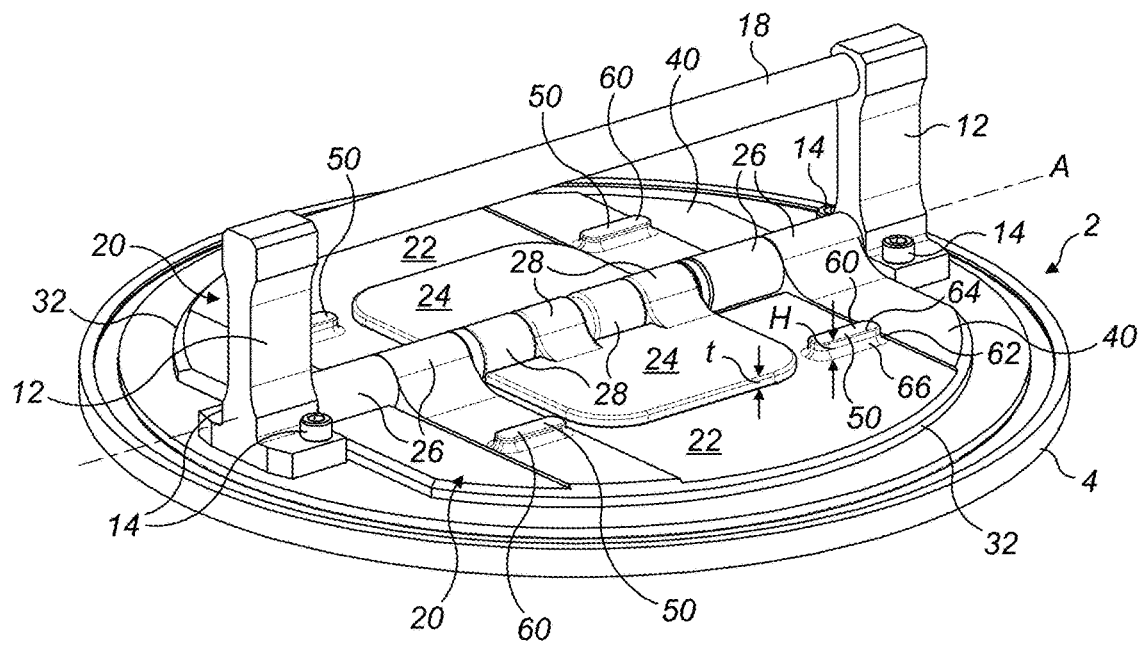
FIG. 1A shows a perspective view of an embodiment of a check valve in accordance with this disclosure, in a closed configuration.

A first embodiment of a check valve 2 in accordance with this disclosure is illustrated in FIGS. 1A to 2C.

The check valve 2 comprises a valve housing 4. The valve housing 4 is a generally planar annular element which in use may be mounted in a pipe, duct or the like. The valve housing 4 comprises a pair of generally D-shaped valve openings 6 which are separated by a central web 8 (see FIG. 1B) of the valve housing 4.

A pair of mounting posts 12 extend upwardly from the valve housing 4. As shown, the mounting posts 12 may be separately formed from the valve housing and mounted thereto by suitable means, for example by bolts or other fasteners 14. Alternatively, the mounting posts 12 may be integrally formed, for example cast, with the valve housing 4.

A hinge pin 16 (see FIG. 2A) is mounted between the mounting posts 12 above the central web 8. The hinge pin 16 may be a unitary structure as shown, or be constituted from two or more sections. A stop element in the form of a stop pin 18 is also mounted between the mounting posts 12, above the hinge pin 16. The term pin as used herein does not imply any particular shape or dimension. For example, while the stop pin 18 is shown as circular in cross section, it could have other cross sectional shapes. It also encompasses multi-part constructions as well as unitary constructions.

The valve openings 6 are closed by a pair of generally D-shaped flappers 20 which are pivotally mounted to the hinge pin 16. Each flapper 20 comprises a primary flapper element 22 and a secondary flapper element 24. The primary flapper element 22 and the secondary flapper element 24 are separately pivotally mounted to the hinge pin 16. Each primary flapper element 22 has a pair of primary mounting lugs 26 arranged one on either side of the associated secondary flapper element 24. Each secondary flapper element 24 has a pair of secondary mounting lugs 28. The secondary mounting lugs 28 of the two secondary flapper elements 24 are arranged in an alternating fashion along the hinge pin 16.

Each primary flapper element 22 is generally planar and is D-shaped in shape. The lower surface 30 of each primary flapper element 22 is formed with a peripheral lip 32 which is configured to engage around the periphery of the associated valve housing opening 6 when the valve 2 is closed.

A flapper opening 34 is formed through a central region 36 each primary flapper element 22. In this embodiment, the flapper opening is generally rectangular in shape, but other shapes of flapper opening 34, for example circular, oval or ellipsoidal, are contemplated within the scope of the disclosure. The flapper opening 34 is positioned generally centrally between the sides of each primary flapper element 22, between the mounting lugs 26 of the primary flapper element 22, but is offset from the centre of the primary flapper element 22 in a direction towards the hinge pin 22 or mounting lugs 26. The stresses in this region of the primary flapper element 22 will be relatively low.

Each secondary flapper element 24 is generally planar or plate-like in shape. It has a lower surface 38 which is shaped complementarily to the upper surface 40 of the associated primary flapper element 22 at least around the flapper opening 34 so as to be capable of closing the flapper opening 34 when the secondary flapper element 24 is received on the upper surface 40 of the primary flapper element 22. Alternatively, the secondary flapper element 24 may at least partially enter the flapper opening 34.

In this embodiment, each secondary flapper element 24 is of the same order of thickness as each primary flapper element 22, or at least as the central region 36 of each primary flapper element 22. They may, however, depending on the particular application, be thinner than each primary flapper element 22 or even thicker. However, due to their size, the mass of the secondary flapper elements 24 and their moments of inertia about the hinge pin 16 will be significantly lower than the mass of the primary flapper elements 22 and their moments of inertia about the hinge pin 16.

In this embodiment, the primary and secondary flapper elements 22, 24 may be formed of the same material. The material chosen will depend on the particular application. For example, in low temperature and/or pressure applications, an aluminium alloy may be a suitable material. For higher temperature and/or pressure applications, a steel, such as a nickel steel (for example Inconel®) or a stainless steel may be appropriate. Similar materials may be used for the valve housing 4 and mounting posts 12.

When an opening pressure differential is applied to the check valve 2 in an opening direction A, the secondary flapper elements 24 will start to pivot around the hinge pin 16 before the primary hinge flapper elements 22, due to their lower mass and inertia. The rotation of the secondary flapper elements 24 relative to the primary flapper elements 22 will begin to open the flapper openings 34. This has the effect of reducing the relative pressure acting on the primary flapper elements 22, as in effect, some of the fluid flow is vented through the flapper openings 34. This in turn means that the primary flapper elements 22 will pivot less quickly than in a unitary construction.

The secondary flapper elements 24 will continue to rotate until they impact the stop element 18. In this position, the primary flapper elements 22 are have not yet reached their fully open positions. In earlier check valves as disclosed in US 2017/0204981 A, the primary flapper elements 22 will continue to rotate until they impact the now fully opened secondary flapper elements 24. However, in accordance with the present disclosure, the primary flapper elements 22 will impact the stop element 18, rather than the secondary flapper elements 24, as will now be explained in more detail below.

The check valve 2 shown in FIG. 1A has four bumpers 50. As shown, a pair of bumpers 50 is provided on the upper surfaces 40 of each of the primary flapper elements 22. The pairs of bumpers 50 each comprise one bumper 50 arranged on either side of the associated secondary flapper elements 24. The bumpers 50 are arranged at a distance d from the axis A that extends longitudinally along the centre of the hinge pin 16 (the hinge pin axis A). A stop surface of the stop element 18 is arranged at a height h above the hinge pin axis A. The height h and the distance d are generally equal such that with the primary flapper elements 22 in their open positions, the bumpers 50 will contact the stop element 18.

The bumpers 50 may be elongate, as shown, for example having an upper surface 60 with an oblong shape. In other embodiments, the bumpers 50 may have another shape, for example a circular or rectangular shape. The bumpers 50 may have sides 62 with a planar upper portion 64 and a filleted root portion 66.

The bumpers 50 may be integrally formed with the primary flapper elements 22, for example by casting or additive manufacturing.

Figure 1B:
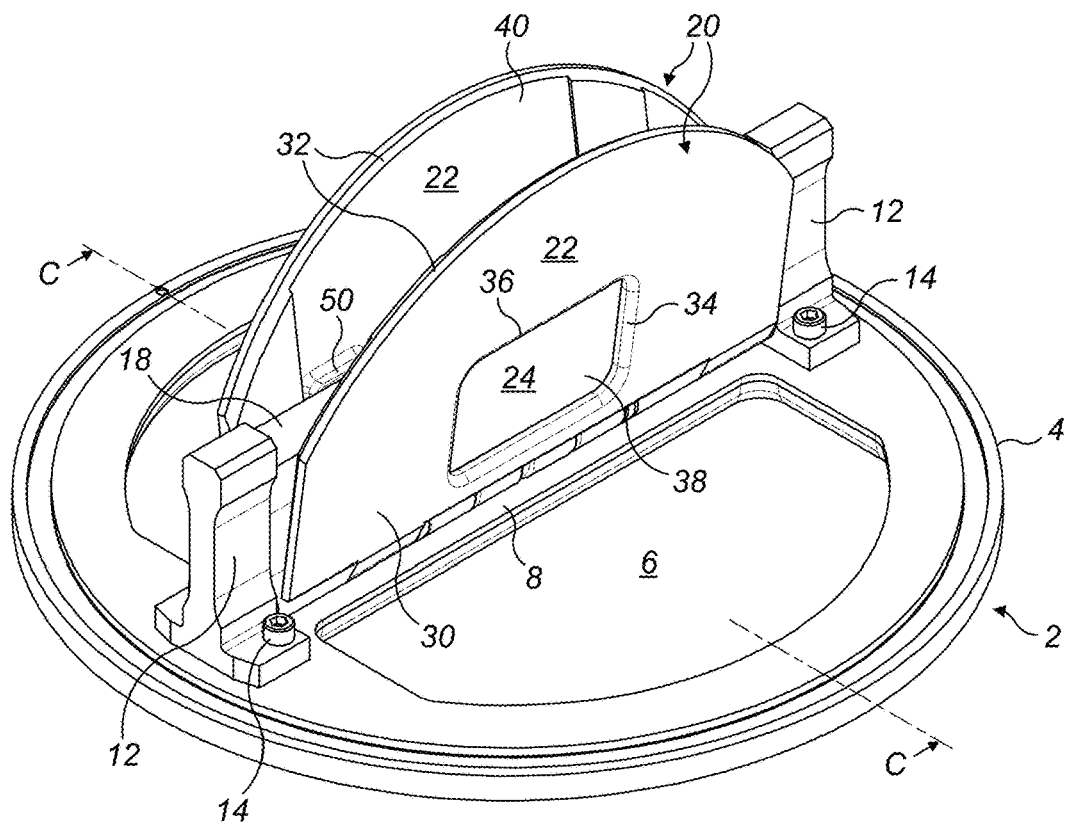
FIG. 1B shows a perspective view of the check valve of FIG. 1A, in an open configuration.

As can be seen in FIG. 1B, the bumpers 50 on the primary flapper elements 22 contact the stop element 18 in the open position. In the embodiment illustrated the bumpers 50 on the respective primary flapper elements contact the stop element 18 at axially aligned, opposed locations on the stop element 18, i.e. at the same distance along the stop element 18 in a direction parallel to the hinge pin axis A. The bumpers 50 are therefore symmetrically arranged about the hinge pin axis A. This arrangement may be advantageous as it may prevent adverse bending stresses being generated in the stop element 18, which might occur if the bumpers 50 were not aligned.

Figure 1C:
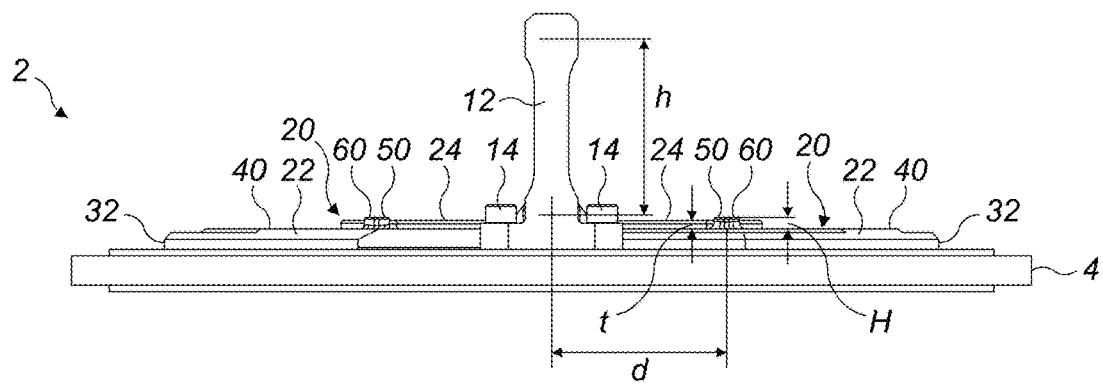
FIG. 1C shows a side view of the check valve of FIG. 1A, in a closed configuration.
Figure 1D:
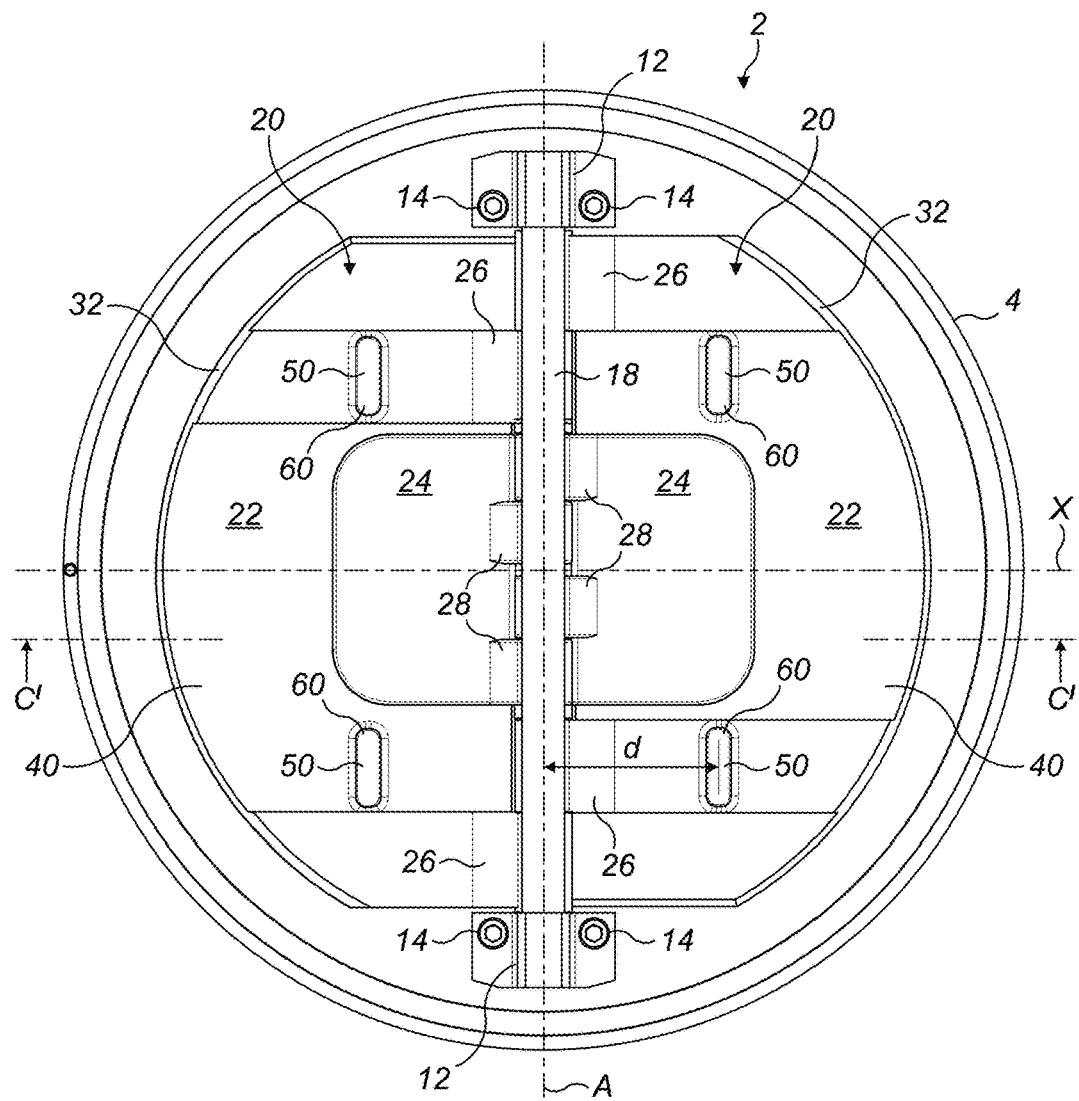
FIG. 1D shows a top view of the check valve of FIG. 1A, in a closed configuration.
Figure 2A:
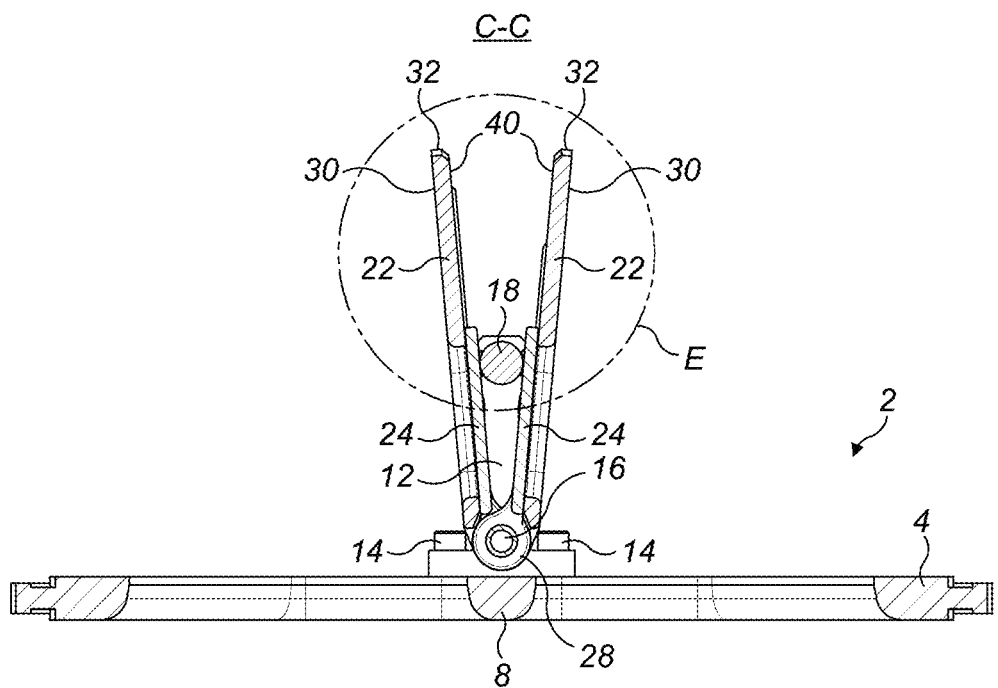
FIG. 2A shows a side view of the check valve of FIG. 1A, in an open configuration.
Figure 2B:
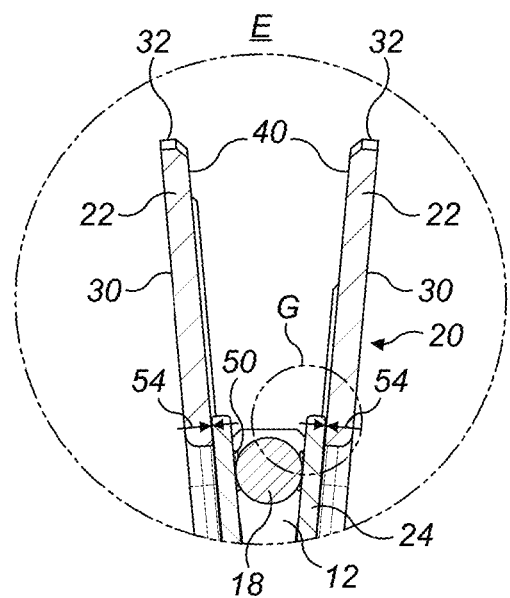
FIG. 2B shows a magnified view of area E of FIG. 2A.
Figure 2C:
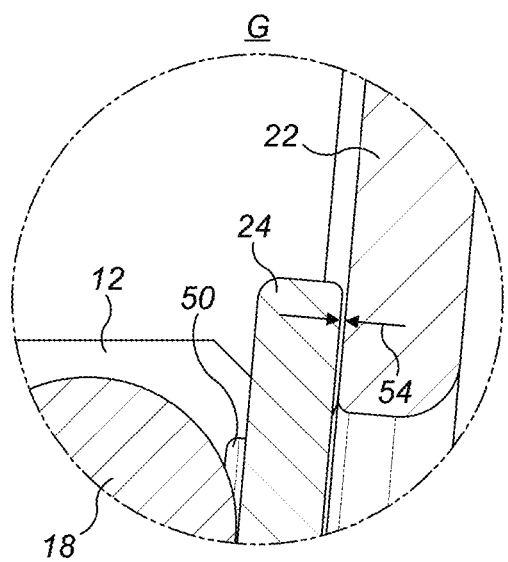
FIG. 2C shows a magnified view of area G of FIG. 2B.

The bumpers 50 each have a greater height H than the thickness t of the secondary flapper elements 24 as can be appreciated from FIG. 1C. As can be seen in FIGS. 2A-C, this results, in the open position, in both the primary and secondary flapper elements 22, 24 contacting the stop element 18 and a clearance 54 being provided between each primary flapper element 22 and its associated secondary flapper element 24 of the flappers 20. The size of the clearances 54 may be equal to the difference between the height H of the bumpers 50 and the thickness t of the secondary flapper element 24. The clearances 54 may be large enough to accommodate wear and/or elastic deformation or flex of the primary flapper elements 22, the bumpers 50 and/or the stop element 18 such that the primary flapper element 22 still does not contact the secondary flapper element 24 in the open position. Typically, the clearances 54 may be greater than 0.5 mm, for example greater than 1 mm.

Figure 8A:
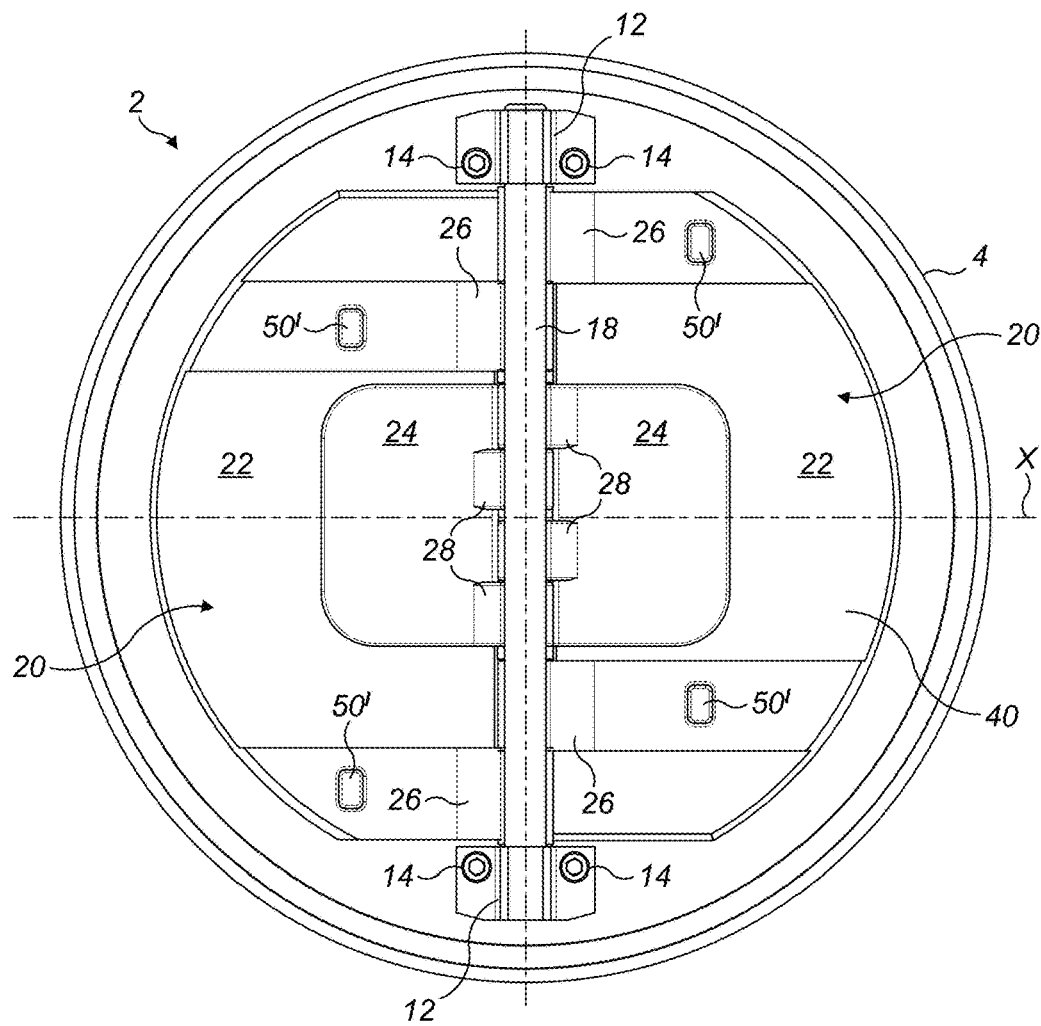
FIG. 8A shows a top view of another embodiment of a check valve in accordance with this disclosure, in a closed configuration.
Figure 8B:
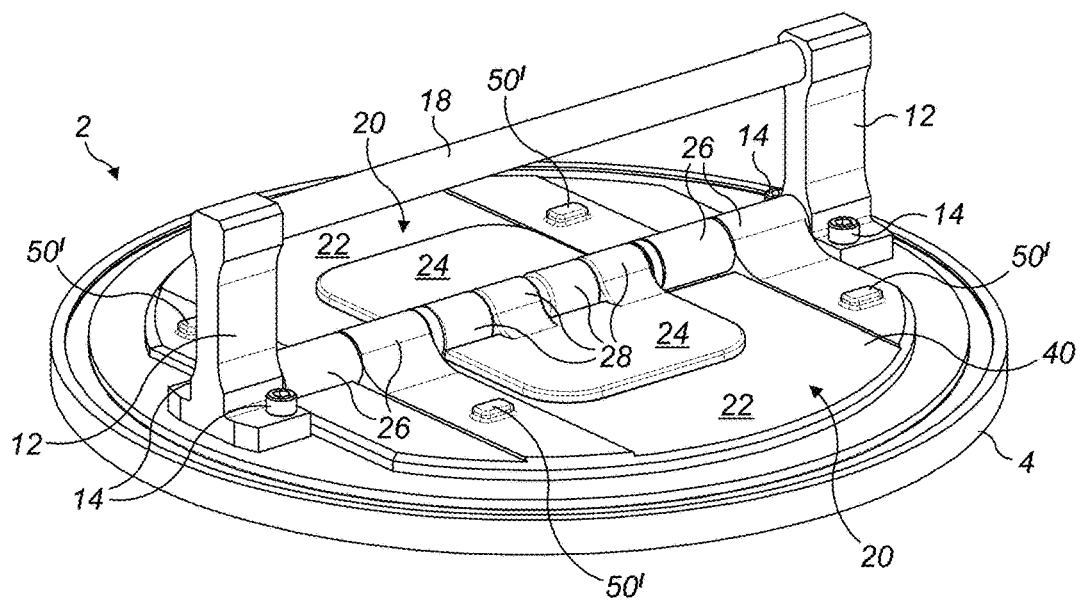
FIG. 8B shows a perspective view of the check valve of FIG. 8A.

It will be appreciated that each primary flapper element 22 may have more or fewer bumpers 50 than shown in the Figures. However, two bumpers 50 on each primary flapper element 22 are advantageous to avoid uneven forces in the primary flapper elements 22. Advantageously, the bumpers 50 may be arranged symmetrically with respect to the central axis X (see FIG. 1D). In another embodiment, for example as shown in FIGS. 8A and 8B, the bumpers may be arranged asymmetrically with respect to the central axis X.

Figure 3:
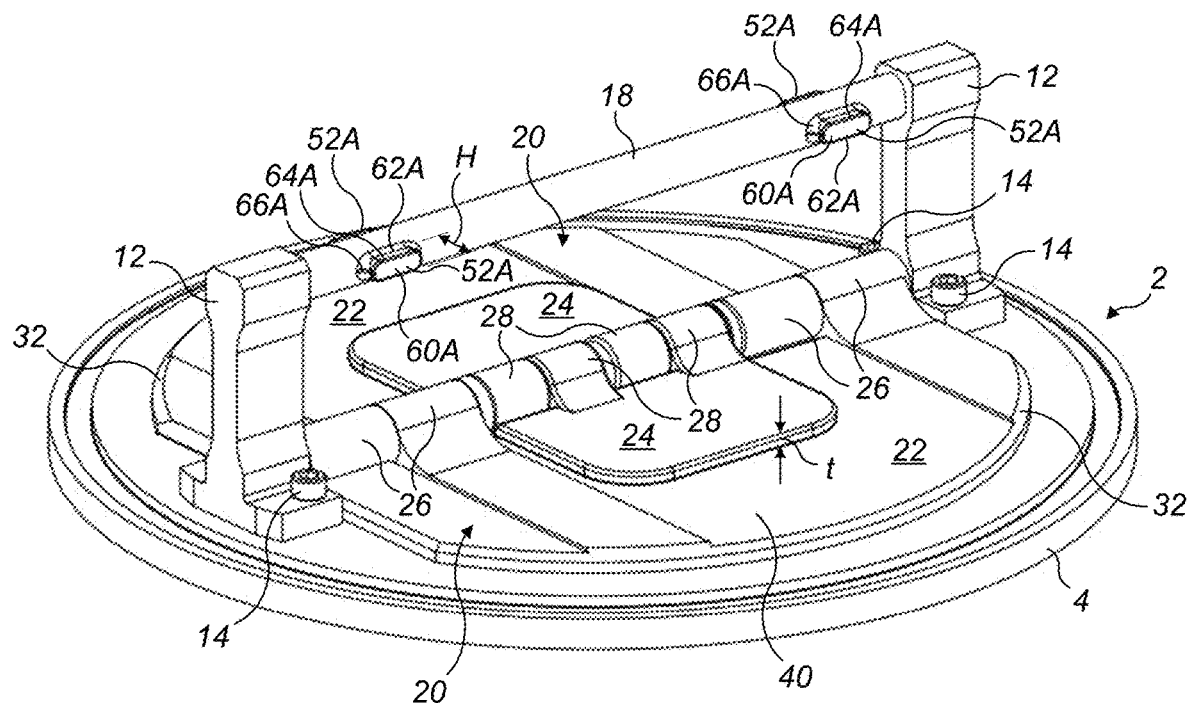
FIG. 3 shows a perspective view of another embodiment of a check valve in accordance with this disclosure, in a closed configuration.
Figure 4:
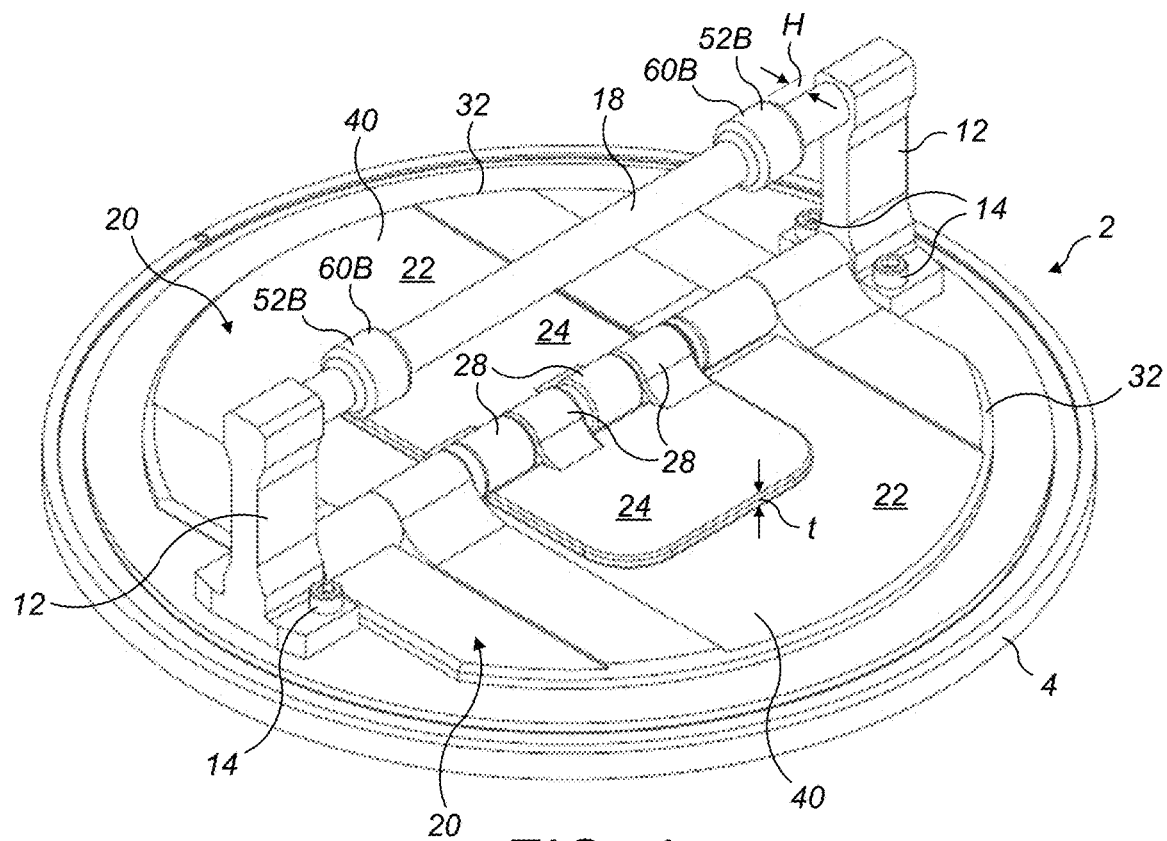
FIG. 4 shows a perspective view of another embodiment of a check valve in accordance with this disclosure, in a closed configuration.
Figure 5:
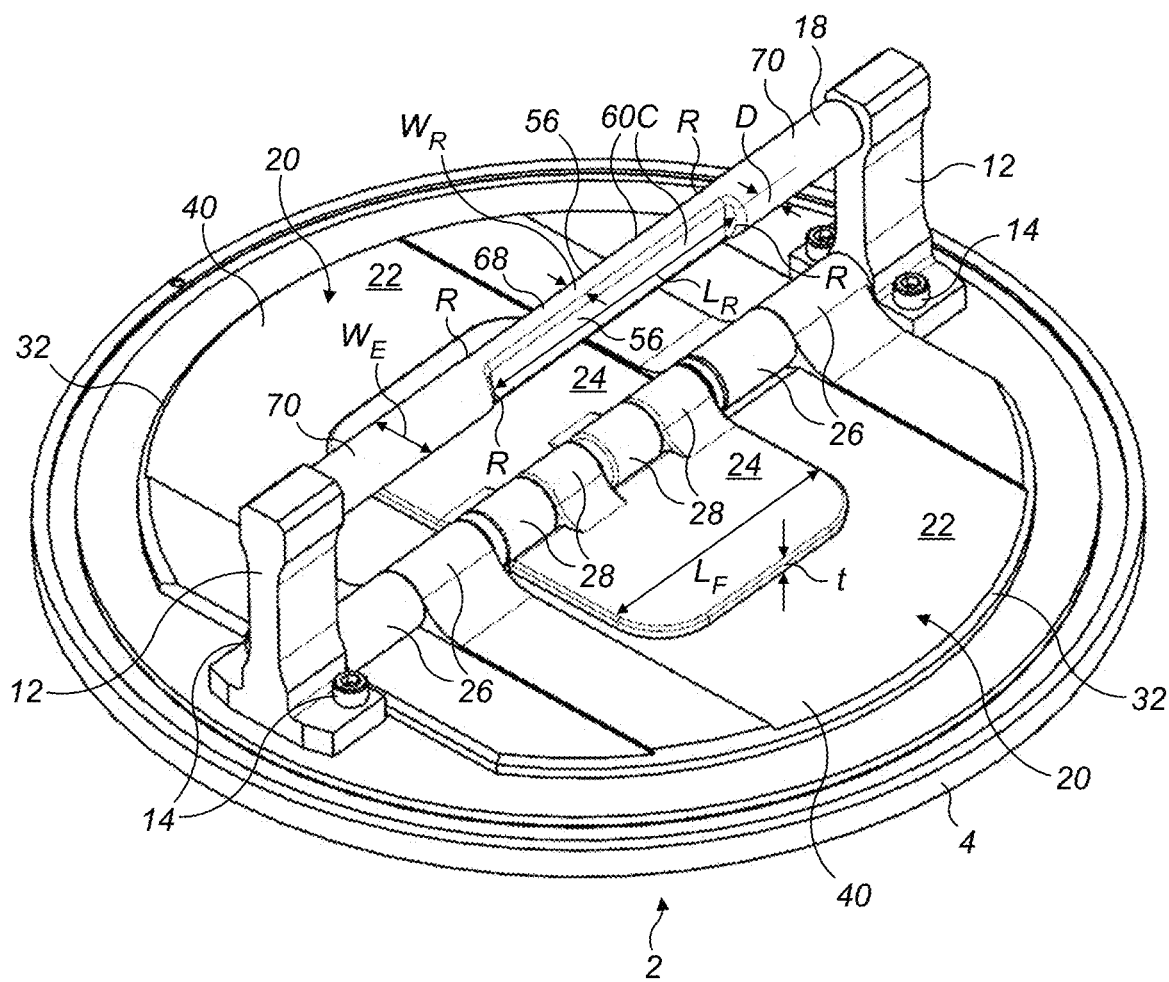
FIG. 5 shows a perspective view of another embodiment of a check valve in accordance with this disclosure, in a closed configuration.

The desired clearance between the primary flapper elements 22 and secondary flapper elements 24 can also be achieved in a number of different ways. Alternative embodiments illustrating such arrangements are shown in FIGS. 3 to 5. In these embodiments, as will become apparent, the primary flapper element 22 may have no bumpers, with bumpers or recesses in effect being provided on the stop element 18.

FIG. 3 illustrates an embodiment of the present disclosure wherein a pair of bumpers 52A is provided on each side of the stop element 18, one to either side of the secondary flapper element 24. The bumpers 52A contact the primary flapper elements 22 in the open position. Similarly to bumpers 50, the bumpers 52A each have a greater height H than the thickness t of the secondary flapper element 24. In this embodiment the primary flapper elements 22 may be devoid of bumpers 50.

It will be appreciated that, in an alternative arrangement, a single bumper 52A may be provided on each side of the stop element 18. However, providing two bumpers 52A on each side of the stop element 18 are advantageous to avoid uneven forces in the primary flapper elements 22. Advantageously, the bumpers 52A may be arranged symmetrically with respect to the central axis X (see FIG. 1D).

The bumpers 52A may be aligned, as shown, on opposite sides of the stop element 18. This will allow, as in the earlier embodiment, the impact force of the primary flapper elements 22 on the stop element 18 to be at the same axial position along the stop element 18, thereby potentially mitigating adverse bending forces in the stop element 18.

The bumpers 52A may be elongate, as shown, for example having a surface 60A with an oblong shape, or may have another shape, for example circular or rectangular, surface. The bumpers 52A may have sides 62A with a planar upper portion 64A and a filleted root portion 66A.

The bumpers 52A may be integrally formed with the stop element 18, for example by casting or additive manufacturing.

FIG. 4 illustrates an embodiment, similar to that of FIG. 5, wherein bumpers 52B are formed to extend circumferentially around the stop element 18 as collars 52B. The collars also have a height H, as measured from the stop element 18 to the outer surface 60B of the collar 52B, that is greater than the thickness t of the secondary flapper elements 24.

The use of a collar 52B or collars 52B, may enable the stop element 18 to be positioned at any angular configuration in the mounting posts 12 without impairing the functionality of the bumpers 52B. This may facilitate assembly of the check valve 2. The collars 52B may also facilitate manufacture of the stop element 18, allowing it, for example to be formed as a turned component.

The collars 52B may have a circular shape as viewed along the hinge axis, or alternatively, may be formed to have a square, hexagonal or other shape as viewed along the hinge axis.

It will be appreciated that the stop element 18 may have more or fewer bumpers 52B or collars 52B than shown in FIGS. 3 and 4. However, two collars 52B arranged on the stop element 18 are advantageous to avoid uneven forces in the primary flapper elements 22. Advantageously, as in the earlier embodiments, the collars 52B may be arranged symmetrically with respect to the central axis X (see FIG. 1D for the axis X).

FIG. 5 illustrates a yet further embodiment of the disclosure. In this embodiment, wherein the stop element 18 includes a recess 56, or a notch, on each side of the stop element 18. The recesses 56 may be in a central portion 68 of the stop element 18 positioned between end portions 70 of the stop element 18 in the hinge axis direction A. The recesses 56 may have any convenient shape. As illustrated they are formed as slots on opposed sides of the stop element 18. Alternatively, the stop element 18 may include a recess 56 which extends circumferentially around the stop element 18 to provide an annular recess 56.

The recesses 56 may have surfaces 60C which contact the secondary flapper 2 60C are arranged such that they will lie parallel to the opposed surfaces of the secondary flapper elements 24 in the open position such that an areal, rather than a line contact occurs between the secondary flapper elements 24 and the stop element. This will dissipate impact forces over a larger area of the stop element 18.

The recesses 56 receive the secondary flapper elements 24 in the open position of the valve 2. The recesses 56 have greater depths D than the heights H of the secondary flapper elements 24 so that similarly to the embodiments discussed with regard to FIGS. 1A to 2C, clearances 54 between the primary and secondary flapper elements 22, 24 are thereby provided in the open position.

The clearances 54 are equal to the difference between the depths D of the recesses 56 and the heights H of the secondary flapper elements 24. The recesses 56 may have, as shown, lengths $L_R$ slightly larger in the direction parallel to the hinge pin axis A than the lengths $L_F$ of the secondary flapper elements 24. The recesses 56 may have curved sides, with radii of curvature R.

In certain embodiments, the recesses 56 may allow the check valve flappers 20 to open further than the other embodiments provided herein, providing a greater flow area through the valve 2.

It will be appreciated that the bumpers 52A, 52B and/or the recess 56 of the embodiments shown in FIGS. 3 to 5 and described above will act in a similar way to the embodiment shown in FIGS. 1A to 2C to provide clearances 54 between the primary and secondary flapper elements 22, 24.

It will also be appreciated that various features of the embodiments shown in the figures may be used in combination. For example, bumpers 50 could be provided on the primary flapper elements 22 and bumpers 52A could be provided on the stop element 18, which would result in bumpers 50 contacting bumpers 52A in the open position of the valve 2.

Figure 6:
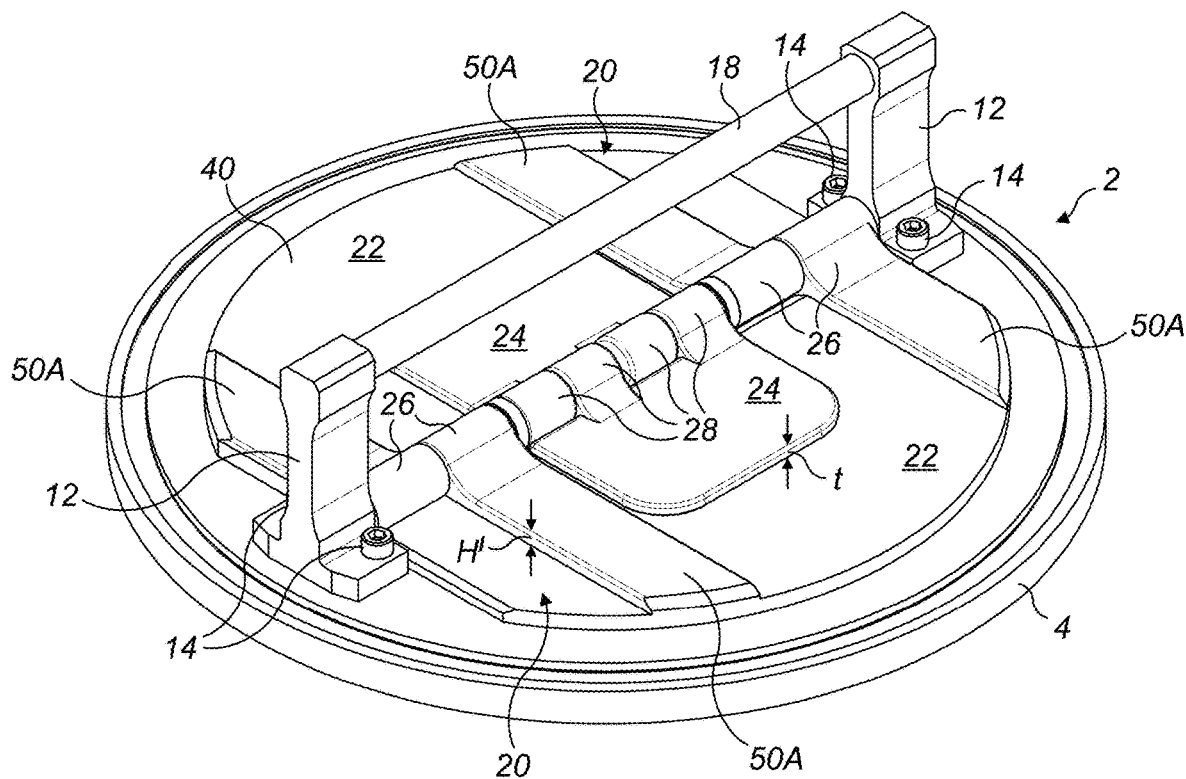
FIG. 6 shows a perspective view of another embodiment of a check valve in accordance with this disclosure, in a closed configuration.

In further embodiments, as illustrated in FIG. 6, the check valve 2 may have a different bumper arrangement, wherein lug extension bumpers 50A are provided on each of the primary flapper elements 22. Lug extension bumpers 50A are raised portions of the primary flapper elements 22 extending from the lugs 26 to the peripheral lip 32 of each of the primary flapper elements 22 perpendicular to the hinge pin axis A. The height H' of the lug extension bumpers 50A is larger than the thickness t of the secondary flapper element 24 to provide a clearance 54 in the open position.

Figure 7:
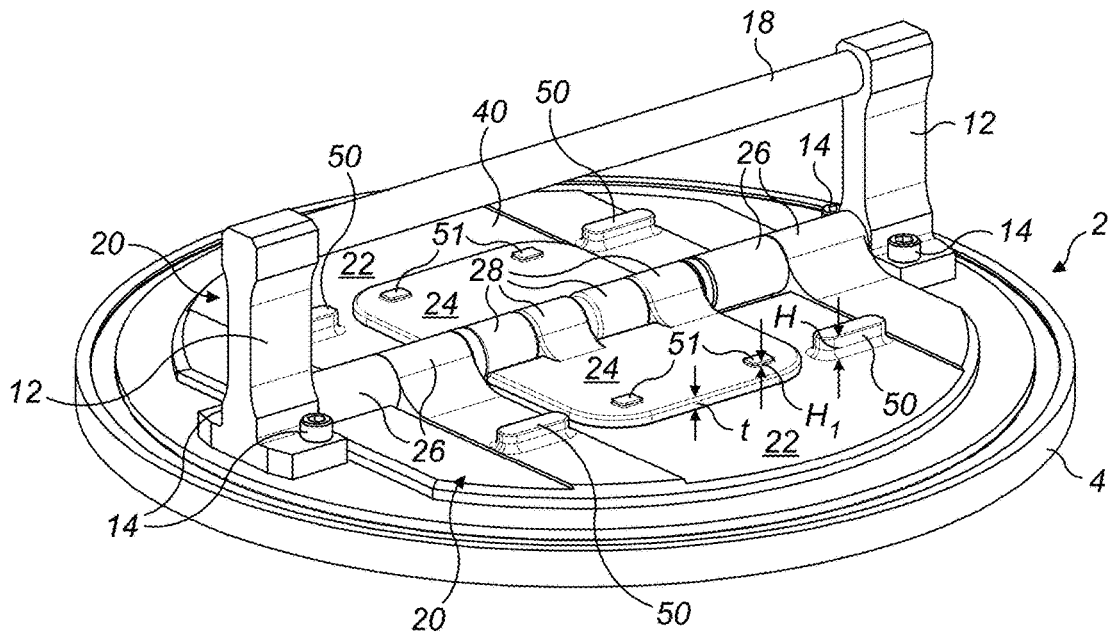
FIG. 7 shows a perspective view of another embodiment of a check valve in accordance with this disclosure, in a closed configuration.

In further embodiments, as illustrated in FIG. 7, the secondary flapper elements 24 could also be provided with bumpers 51. However, the relative heights H, $H_1$ of the bumpers 51' associated with the secondary flapper elements 24 and the bumpers 50 associated with the primary flapper elements 22 should be such that the clearance 54 is still present in the open position of the flappers 20. The sum of the height $H_1$ of each bumper 51 associated with the secondary flap elements 24 and the thickness t of the secondary flap element 24 may be larger than the height H of each bumper 50 associated with the primary flapper element 22.

In another embodiment, illustrated in FIGS. 8A and 8B, in contrast to the embodiment of FIGS. 1A to 1D, bumpers 50' may be asymmetrically arranged about the hinge pin axis A. In other words, the bumpers 50' on the primary flapper elements 22 are, in some embodiments different distances along the hinge pin axis A on each respective primary flapper element 22 such that they do not contact the stop element 18 opposite one another. In the example shown, the bumpers 50' are arranged on each primary flapper element 22 aligned with the lugs 26 that attach each respective primary flapper element 22 to the hinge pin 16. Apart from the distance along the hinge pin axis A as described above, the bumpers 50' may have the same characteristics as the bumpers 50 described above in relation to the various embodiments. The embodiment of FIG. 7 may be modified in a similar arrangement. Also in that embodiment, the bumpers 51 provided on the secondary flapper elements may, additionally or alternatively, be axially offset rather than axially opposed as shown.

The various arrangements as discussed above, wherein both the primary and the secondary flapper elements 22, 24 contact the stop element 18 and clearances 54 are provided between the primary and secondary flapper elements 22, 24, may be advantageous in that they may mitigate the possibility of damage to the primary flapper element 22 due to the impact of the secondary flapper element 24 thereon. For example, stresses which may arise from the primary flapper elements 22 contacting the secondary flapper elements 24 around the flapper openings 34 in an open position may be avoided. This will potentially prolong the life of the flapper elements 22 and thus the serviceable life of the check valve 2.

It will be appreciated that the flapper element construction and/or the stop element construction disclosed herein may be employed in new valve constructions, and potentially also in the refurbishment or repair of existing check vales where the prior unitary flappers or flappers wherein the primary flapper element 22 does not contact the stop element 18 in the open position may be replaced with the new construction.

It will also be understood that the above is a description of a limited number of possible embodiments of the disclosure and that modifications may be made thereto without departing from the scope of the disclosure.

For example, in the embodiment described above, the primary flapper element 22 is provided with just a single flapper opening 34. More than one flapper opening 34 may be provided in each primary flapper element 22. A single secondary flapper element 24 or more than one secondary flapper element 24 may be arranged to close the flapper openings 34. Multiple flapper openings 34 and/or secondary flapper elements 24 may be more suited to larger check valves. In these instances, additional bumpers 50, 52A, collars 52B and/or recesses 56 will be provided to prevent contact between any of the secondary flapper elements 24 and the primary flapper elements 22.

As used herein, terms relating to "up" or "above" are made with reference to the direction from the hinge pin 16 to the stop element 18, perpendicular to the hinge pin 16, as being up. It will be appreciated however, that the valve 2 may be used in other orientations and so the upwards direction is defined with regard to the frame of reference of the valve 2 rather than its environment.

The invention claimed is:

1. A check valve comprising:
   a valve housing defining a pair of valve openings;
   a pair of flappers pivotably mounted for rotation relative to the housing between an open position in which they permit fluid flow through the respective valve openings and a closed position in which they prevent fluid flow through the valve openings; and
   a stop element arranged such that the flappers will contact the stop element in their open positions; wherein:
   each flapper comprises a primary flapper element pivotally mounted to a hinge pin extending across the valve, and a secondary flapper element;
   the primary flapper element further comprises at least one flapper opening formed therethrough; and
   the secondary flapper element is pivotally mounted such that it may rotate relative to the primary flapper element for opening and closing the at least one flapper opening in the primary flapper element; wherein:
   the stop element, each primary flapper element and each secondary flapper element are configured such that when each flapper is in the open position and in contact with the stop element, both the primary and secondary flapper elements contact the stop element and a clearance is provided between the primary flapper element and the secondary flapper element of each flapper.

2. A check valve as claimed in claim 1, comprising one or more bumpers provided on the primary flapper elements or the stop element for creating the clearance.

3. A check valve as claimed in claim 2, comprising at least one bumper on the primary flapper element, for contacting the stop element in the open position.

4. A check valve as claimed in claim 3, comprising at least one bumper provided on the stop element for contacting the primary flapper element in the open position.

5. A check valve as claimed in claim 4, wherein the at least one bumper comprises a collar that extends circumferentially around the stop element.

6. A check valve as claimed in claim 5, wherein the bumpers are symmetrically arranged about a hinge pin axis (A).

7. A check valve as claimed in claim 5, wherein the bumpers are asymmetrically arranged about a hinge pin axis (A).

8. A check valve as claimed in claim 3, comprising a pair of bumpers, one to either side of the secondary flapper element.

9. A check valve as claimed in claim 8, wherein the pair of bumpers are symmetrically arranged about a central axis (X).

10. A check valve as claimed in claim 3, wherein the at least one bumper has a greater height (H) than the thickness (t) of the secondary flapper element.

11. A check valve as claimed in claim 1, comprising a recess defined in the stop element for receiving the secondary flapper element.

12. A check valve as claimed in claim 11, wherein the recess has a depth (D) greater than the thickness (t) of the secondary flapper element.

13. A check valve as claimed in claim 12, comprising a pair of recesses arranged on opposed sides of the stop element.

14. A check valve as claimed in claim 12, comprising an annular recess formed on the stop element.

15. A check valve flapper comprising:
a primary flapper element and a secondary flapper element,
wherein:
the primary and secondary flapper elements have mounting lugs for pivotally mounting the elements to a common hinge pin;
the primary flapper element has at least one flapper opening formed therethrough;
the secondary flapper element is configured to be rotatable relative to the primary flapper element and to cooperate with the primary flapper element to close the at least one flapper opening in one relative rotational position;
the primary flapper element comprises at least one bumper formed on the same side of the primary flapper element as the secondary flapper element, the bumper having a height (H) greater than a thickness (t) of the secondary flapper element.

* * * * *